United States Patent
Tang

(10) Patent No.: US 8,069,535 B2
(45) Date of Patent: Dec. 6, 2011

(54) HINGE ASSEMBLY AND FOLDABLE ELECTRONIC DEVICE USING THE SAME

(75) Inventor: Zi-Ming Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 361 days.

(21) Appl. No.: 12/422,362

(22) Filed: Apr. 13, 2009

(65) Prior Publication Data

US 2010/0125974 A1     May 27, 2010

(30) Foreign Application Priority Data

Nov. 21, 2008   (CN) .......................... 2008 1 0305695

(51) Int. Cl.
*E05D 11/10* (2006.01)
(52) U.S. Cl. .......................................... 16/342; 16/334
(58) Field of Classification Search ................. 016/342, 016/333–335, 386, 50, 54, 290, 299, 327, 016/328; 455/575.1, 575.4, 550.1, 90.3; 379/433.12, 433.13; 361/679.11, 679.12, 361/679.27
See application file for complete search history.

(56) References Cited

U.S. PATENT DOCUMENTS

| | | | | |
|---|---|---|---|---|
| 2,591,476 A * | 4/1952 | Swanson | ........................... | 16/54 |
| 3,583,734 A * | 6/1971 | Magi | ............................... | 403/96 |
| 5,276,945 A * | 1/1994 | Matsumura | ..................... | 16/337 |
| 5,401,045 A * | 3/1995 | Foerster et al. | ............ | 280/250.1 |
| 5,409,297 A * | 4/1995 | De Filippo | ............... | 297/411.32 |
| 5,454,617 A * | 10/1995 | Welter | ........................ | 296/97.9 |
| 5,598,607 A * | 2/1997 | Katagiri | ......................... | 16/337 |
| 5,765,263 A * | 6/1998 | Bolinas et al. | .................. | 16/342 |
| 5,867,866 A * | 2/1999 | Chen et al. | ...................... | 16/50 |
| 6,073,308 A * | 6/2000 | Linnenbrink et al. | .......... | 16/334 |
| 6,481,056 B1 * | 11/2002 | Jesse | ............................... | 16/334 |
| 6,609,273 B1 * | 8/2003 | Yamada et al. | ................. | 16/332 |
| 7,461,432 B2 * | 12/2008 | Lowen et al. | ................... | 16/334 |

* cited by examiner

*Primary Examiner* — Chuck Y. Mah
(74) *Attorney, Agent, or Firm* — Altis Law Group, Inc.

(57) ABSTRACT

A hinge assembly includes a shaft, a tube, an acting member, a friction member, a rotating shaft, and a resilient member. The tube is rotatably sleeved on the shaft. The shaft defines at least one receiving hole. The friction member is positioned in the receiving hole. The rotating shaft extends through the acting member and the shaft to connect the acting member to the shaft rotatably. The resilient member causes the friction member to resist the tube and the acting member. A foldable electronic device applying the hinge assembly is also provided.

20 Claims, 4 Drawing Sheets

HINGE ASSEMBLY AND FOLDABLE ELECTRONIC DEVICE USING THE SAME

BACKGROUND

1. Technical Field

The present disclosure generally relates to hinge assemblies and foldable electronic devices and, particularly, to a hinge assembly used in a foldable electronic device having a top cover and a main body, and a foldable electronic device using the hinge assembly.

2. Description of Related Art

Foldable electronic devices, such as notebook computers, are popular for their portability. In the foldable electronic device, a cover is rotatably connected to a main body via a typical hinge assembly.

The typical hinge assembly often includes a shaft, a friction member fixed on the shaft, and a rotary member rotatably sleeved on the shaft. The rotary member and the shaft are fixed to the cover and the main body. The rotary member is capable of being positioned in any position relative to the friction member and the shaft because of friction created between the friction member and the rotary member. Thus, the cover can be opened to any angle relative to the main body, and remain in any position.

However, over time, the friction abrades the engaging surfaces of the rotary member and the friction member until there is little or no friction between the rotary member and the friction member. Thus, the cover would be incapable of remaining in any desired position. Therefore, the hinge assembly has a relatively short service life.

Therefore, a new hinge assembly and a new foldable electronic device are desired to overcome the above-described shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
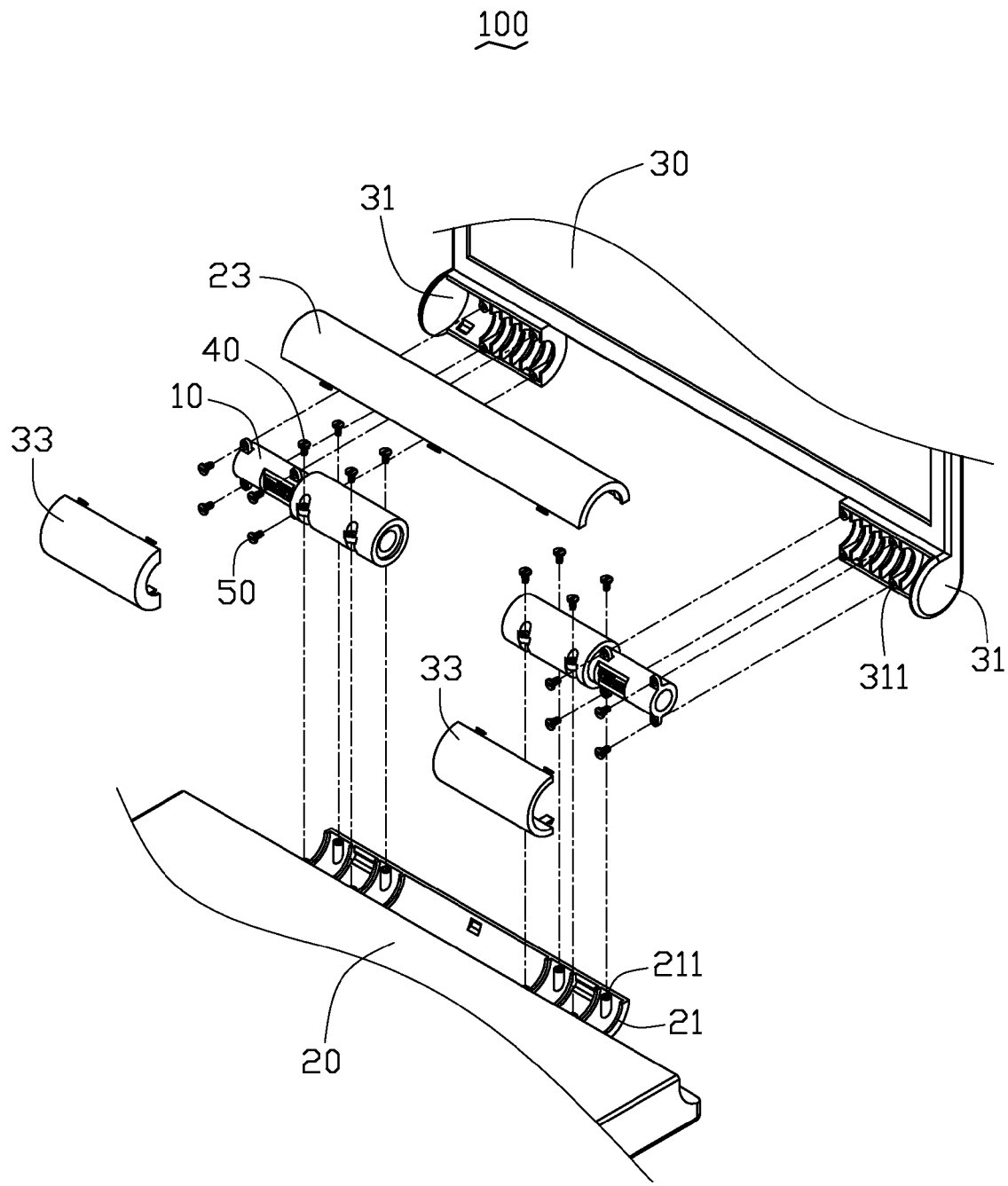
FIG. 1 is an assembled, isometric view of a first embodiment of a hinge assembly, the hinge assembly being shown attached to a main body and a cover of a foldable electronic device.

The present hinge assembly may be used in foldable electronic devices, such as notebook computers, cell phones, media players, and so on. Referring to FIG. 1, for the purposes of conveniently describing the present hinge assembly, a first embodiment of the hinge assembly 10 as used in a notebook computer 100 is described and illustrated.

The notebook computer 100 includes two hinge assemblies 10, a main body 20, and a cover 30. The main body 20 includes a receiving portion 21 and a coupled cover 23. The receiving portion 21 is formed from an edge of the main body 20 and the coupling cover 23 is coupled to the receiving portion 21. The receiving portion 21 defines a plurality of fastener holes 211 therein. The cover 30 includes two mounting portions 31 and two mounting covers 33. The mounting portions 31 are formed from an edge of the cover 30 and the mounting covers 33 are coupled on the mounting portions 31. The mounting portions 31 define a plurality of fastener holes 311 therein.

Figure 2:
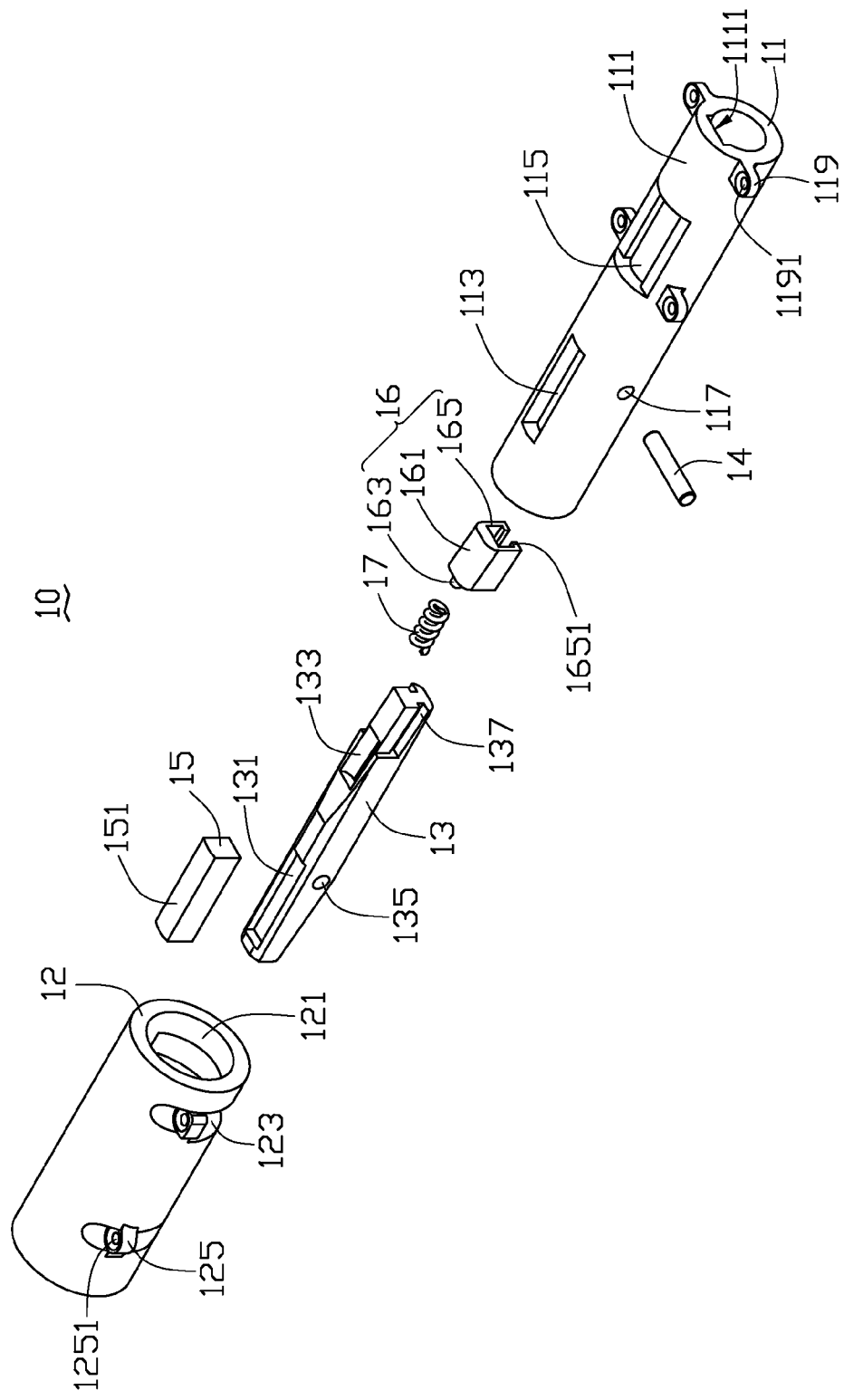
FIG. 2 is an exploded, isometric view of the hinge assembly of FIG. 1.
Figure 3:
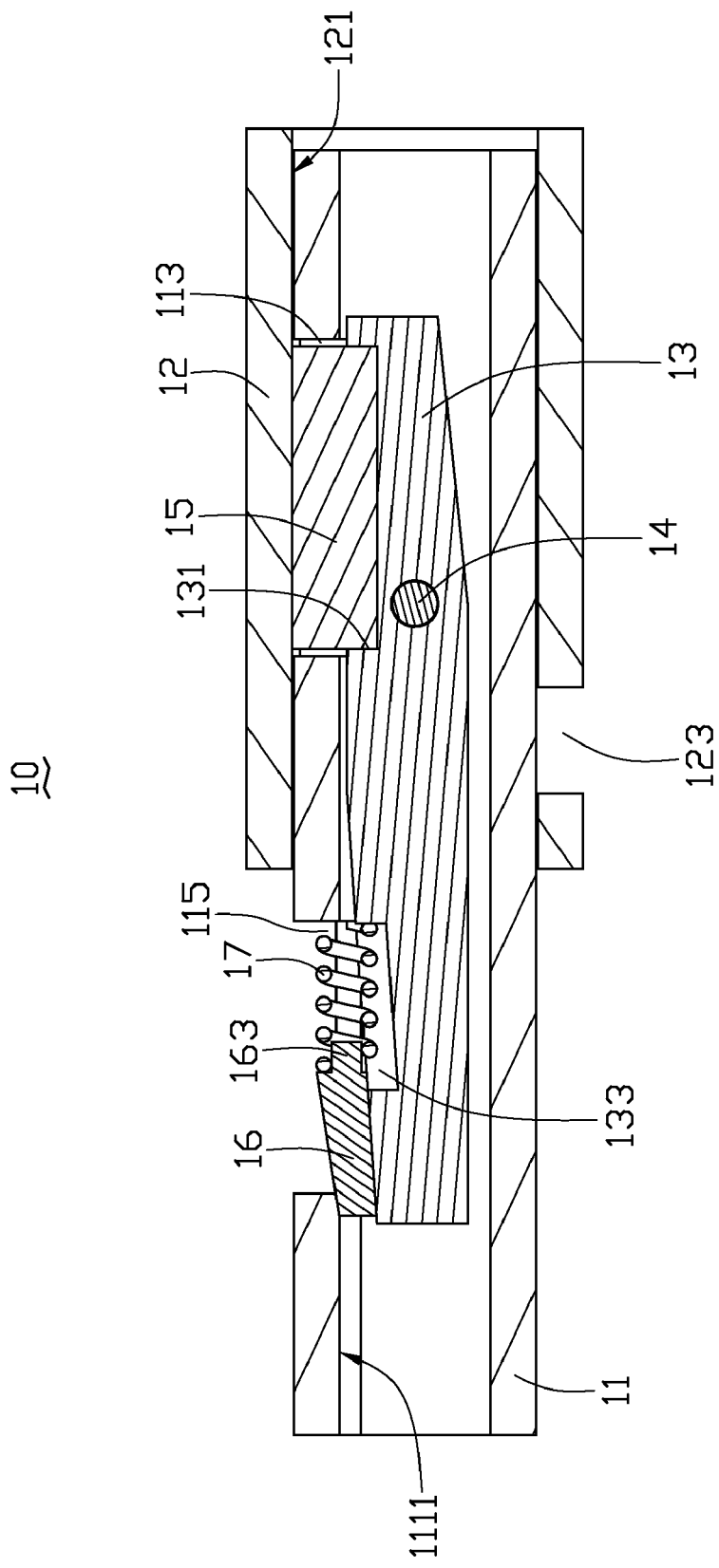
FIG. 3 is a cross-sectional view of the hinge assembly of FIG. 1.

Referring to FIG. 2 and FIG. 3, each hinge assembly 10 includes a hollow cylindrical shaft 11, a hollow cylindrical tube 12, an acting member 13, a rotating shaft 14, a friction member 15, a pushing member 16, and a resilient member 17.

The shaft 11 has a sidewall 111 and an inner surface 1111. The sidewall 111 defines a first receiving hole 113, a second receiving hole 115 and two mounting holes 117. The first receiving hole 113 and the second receiving hole 115 are arranged along a line parallel to the cylindrical axis of the shaft 11. The mounting holes 117 are coaxial and opposite to each other. A plurality of connecting ears 119 are formed on the shaft 11. A connecting hole 1191 is defined in a center portion of each connecting ear 119. The connecting ears 119 are used to connect the shaft 11 to the cover 30.

The tube 12 has an inner surface 121. The tube 12 defines two angular slots 123 in a sidewall of the tube 12. A connecting ear 125 is formed adjacent to each end of each angular slot 123. A connecting hole 1251 is defined in a center portion of each connecting ear 125. The connecting ears 125 connect the tube 12 to the main body 20. An inner diameter of the tube 12 is substantially the same as or slightly larger than an outer diameter of the shaft 11.

The acting member 13 is received in the shaft 11. The acting member 13 defines a first receiving slot 131, a second receiving slot 133, and a connecting hole 135. The first receiving slot 131 and the second receiving slot 133 are aligned in substantially the same direction as the axis of the acting member 13. The connecting hole 135 extends through the acting member 13 and along a direction substantially perpendicular to the axis of the acting member 13. The acting member 13 also defines two engaging slots 137 in opposite sidewalls of the acting member 13.

The rotating shaft 14 may be a cylindrical pin. The rotating shaft 14 is received in the connecting hole 135 of the acting member 13 and the two mounting holes 117 of the shaft 11, thus rotatably connecting the acting member 13 to the rotating shaft 14.

The friction member 15 has a friction surface 151. The friction member 15 is received in the first receiving slot 131 of the acting member 13 and the first receiving hole 113 of the shaft 11, and resists the inner surface 121 of the tube 12.

The pushing member 16 sleeves on the acting member 13 and engages with the engaging slot 137. The pushing member 16 includes a main body 161, a position portion 163, and two opposite inner sidewalls 165. The main body 161 may be a sloped block, and the thinner end of the main body 161 is engaged between the shaft 11 and the acting member 13. The position portion 163 is formed at the thicker end of the main body 161. Each of the inner sidewalls 165 forms an engaging portion 1651, and the engaging portions 1651 engage in the two engaging slots 137 of the acting member 13 respectively.

In the illustrated embodiment, the resilient member 17 is a helical, compression spring. One end of the resilient member 17 resists the acting member 13, and the other end of the resilient member 17 sleeves on the pushing member 16, and resists the main body 161 of the pushing member 16.

Referring to FIG. 1 through FIG. 3, the pushing member 16 sleeves on the acting member 13 with the engaging portions 1651 of the pushing member 16 engaged in the engaging slots 137 of the acting member 13. The acting member 13 is positioned in the shaft 11 and rotatably connected to the shaft 11 by the rotating shaft 14. The first receiving slot 131 of the acting member 13 corresponds to the first receiving hole 113 of the shaft 11. The second receiving slot 133 of the acting member 13 corresponds to the second receiving hole 115 of the shaft 11. The pushing member 16 and the resilient member 17 are positioned in the second receiving hole 115 of the shaft 11. The friction member 15 is received in the first receiving hole 113 of the shaft 11 and the first receiving slot 131 of the acting member 13. A part of the shaft 11 is received in the tube 12. The compressed resilient member 17 creates an elastic force that facilitates the pushing member 16 to resist the inner surface 1111 of the shaft 11. The pushing member 16 presses the acting member 13 to rotate around the rotating shaft 14, thus, the friction surface 151 of the friction member 15 is constantly resisting the tube 12.

When the hinge assemblies 10 are applied in the notebook computer 100, the receiving portion 21 is positioned between the mounting portions 31. The hinge assemblies 10 are disposed in the receiving portion 21 and the mounting portions 31. A plurality of first fasteners 40 are inserted in the connecting holes 1251 of the tubes 12 and engaged in the fastener holes 211 of the main body 20, thus fixing the tubes 12 to the main body 20. A plurality of second fasteners 50 are inserted in the connecting holes 1191 of the shafts 11 and engaged in the fastener holes 311 of the cover 30 correspondingly, thus, fixing the shafts 11 to the cover 30. The coupling cover 23 is coupled on the receiving portion 21 and the mounting covers 33 are coupled on the mounting portions 31 to protect the hinge assemblies 10.

The pushing member 16 can move in the shaft 11 and the acting member 13 by the elastic force created by the resilient member 17. The pushing member 16 can create a force substantially perpendicular to the axis of the shaft 11 because the main body 161 has different thicknesses. The acting member 13 can rotate around the rotating shaft 14 by the force created by the pushing member 16, and as a result, the friction surface 151 of the friction member 15 continuously resists the tube 12 because the acting member 13 resists the friction member 15, even after the hinge assembly 10 has been used over an extended period of time. Thus, the hinge assemblies 10 have a long service life. In use, when the cover 30 is rotated to move relative to the main body 20, the shafts 11 are rotated relative to the tubes 12. Friction is created between the friction members 15 positioned in the shafts 11 and the tubes 12, thereby retaining the cover 30 in any position relative to the main body 20.

Figure 4:
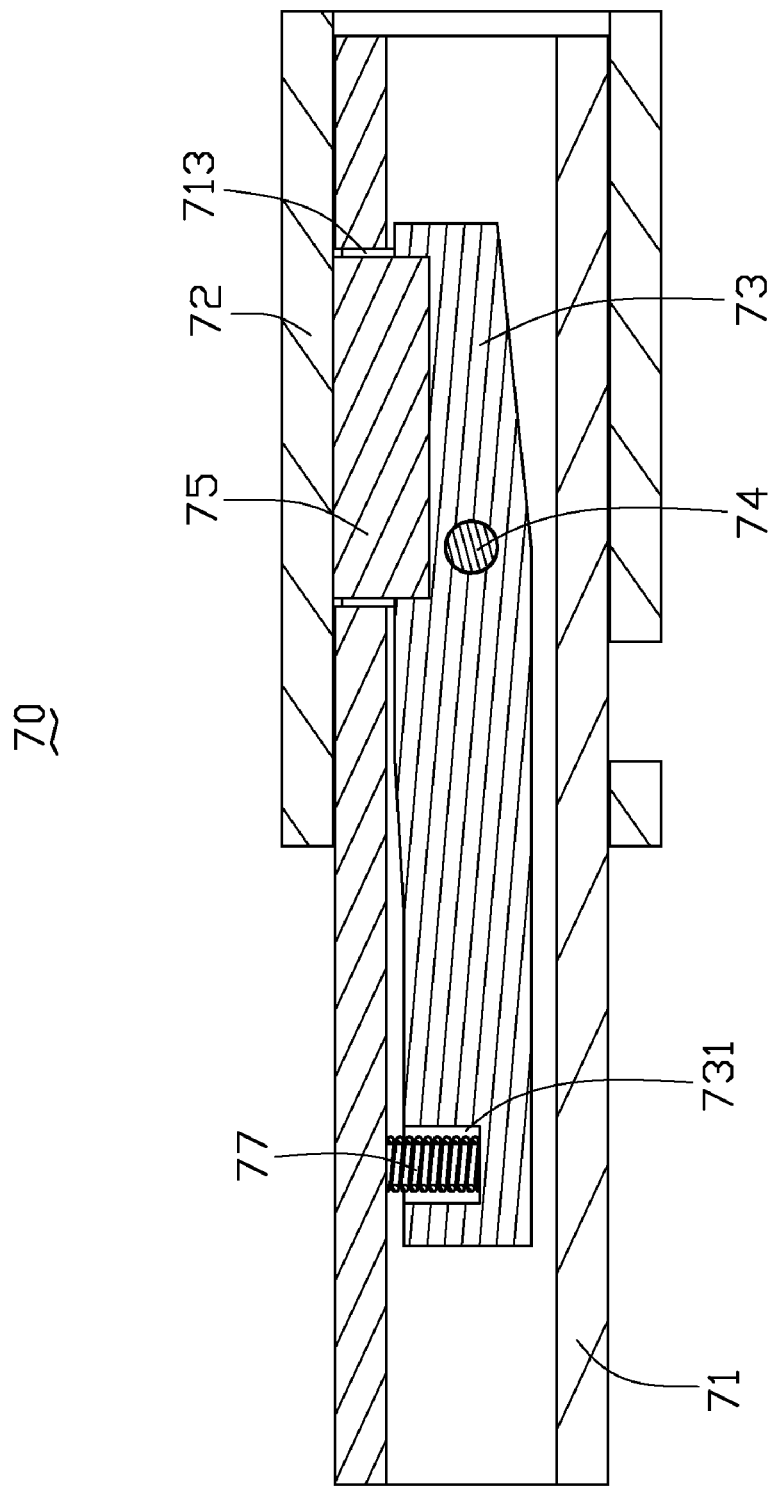
FIG. 4 is a cross-sectional view of a second embodiment of a hinge assembly.

Referring to FIG. 4, a second embodiment of a hinge assembly 70 includes a shaft 71, a tube 72, an acting member 73, a rotating shaft 74, a friction member 75, and a resilient member 77. The shaft 71 defines one hole 713 for receiving the friction member 75. The acting member 73 defines a first receiving slot 731 and a second receiving slot 733. The first receiving slot 731 and the second receiving slot 733 are arranged along a line substantially parallel to the axis of the acting member 73. A part of the friction member 75 is received in the first receiving slot 731. The resilient member 77 is positioned in the receiving slot 731, with one end of the resilient member 77 resisting an inner surface of the shaft 71, and another end of the resilient member 77 resisting the base wall of the receiving slot 731. The resilient member 77 creates an elastic force for pushing the acting member 73 to tend to rotate around the rotating shaft 74, so that the friction member 75 is constantly resisting the tube 72.

In another embodiment, the acting member 73 may define only one receiving slot 731 for receiving a part of the friction member 75. The resilient member 77 is positioned between the shaft 71 and the acting member 73. The friction member 75 and the acting member 73 may also be integrally formed.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A hinge assembly, comprising:
   a shaft, the shaft defining at least one receiving hole;
   a tube rotatably sleeved on the shaft;
   an acting member received in the shaft;
   a rotating shaft extending through the acting member and the shaft to rotatably connect the acting member to the shaft;
   a friction member positioned in the at least one receiving hole and between the tube and the acting member; and
   a resilient member received in the shaft and urging the friction member to resist the tube and the acting member.

2. The hinge assembly of claim 1, wherein the acting member defines two receiving slots; parts of the friction member are received in one of the receiving slots; the resilient member is received in the other receiving slot; the resilient member resists the shaft and the acting member.

3. The hinge assembly of claim 2, wherein the shaft is a hollow cylinder having a sidewall; the at least one receiving hole comprises one receiving hole defined in the sidewall of the shaft; the friction member is positioned in the receiving hole; the friction member resists the acting member and the tube.

4. The hinge assembly of claim 1, wherein the acting member defines two receiving slots; parts of the friction member are received in one of the receiving slots; the hinge assembly further comprises a pushing member; the resilient member resists the acting member and one end of the pushing member; another end of the pushing member is positioned between the shaft and the acting member.

5. The hinge assembly of claim 4, wherein the shaft is a hollow cylinder having a sidewall; the at least one receiving hole comprises two receiving holes defined in the sidewall of the shaft; the friction member is positioned in one receiving hole; the resilient member and the pushing member are partly received in the other receiving hole.

6. The hinge assembly of claim 1, wherein the resilient member is a helical, compression spring.

7. The hinge assembly of claim 1, wherein the tube is a hollow cylinder; an inner diameter of the tube is substantially the same as or slightly larger than an outer diameter of the shaft.

8. A foldable electronic device, comprising:
   a main body;
   a cover rotatably connected to the main body; and
   a hinge assembly, the hinge assembly comprising:
      a shaft fixed to one of the main body and the cover, wherein the shaft defines at least one receiving hole;
      a tube rotatably sleeved on the shaft;
      an acting member received in the shaft;
      a rotating shaft extending through the acting member and the shaft to rotatably connect the acting member to the shaft;
      a friction member positioned in the at least one receiving hole and between the tube and the acting member; and
      a resilient member received in the shaft and urging the friction member to resist the tube and the acting member.

9. The foldable electronic device of claim 8, wherein the acting member defines two receiving slots; parts of the friction member are received in one of the receiving slots; the resilient member is received in the other receiving slot; the resilient member resists the shaft and the acting member.

10. The foldable electronic device of claim 9, wherein the shaft is a hollow cylinder having a sidewall; the at least one receiving hole comprises one receiving hole defined in the sidewall of the shaft; the friction member is positioned in the receiving hole; the friction member resists the acting member and the tube.

11. The foldable electronic device of claim 8, wherein the acting member defines two receiving slots; parts of the friction member are received in one of the receiving slots; the hinge assembly further comprises a pushing member; the resilient member resists the acting member and one end of the pushing member; another end of the pushing member is positioned between the shaft and the acting member.

12. The foldable electronic device of claim 11, wherein the shaft is a hollow cylinder having a sidewall; the at least one receiving hole comprises two receiving holes defined in the sidewall of the shaft; the friction member is positioned in one receiving hole; the resilient member and the pushing member are partly received in the other receiving hole.

13. The foldable electronic device of claim 8, wherein the resilient member is a helical, compression spring.

14. The foldable electronic device of claim 8, wherein the tube is a hollow cylinder; an inner diameter of the tube is substantially the same as or slightly larger than an outer diameter of the shaft.

15. The foldable electronic device of claim 14, wherein the shaft forms a plurality of connecting ears to connect to the cover, each connecting ear defines a connecting hole therein.

16. The foldable electronic device of claim 15, wherein the tube defines two angular slots in a sidewall; a connecting ear is formed at each end of each angular slot; each connecting ear defines a connecting hole therein; the connecting ears connect the tube to the main body.

17. A hinge assembly, comprising:
 a hollow shaft;
 a tube rotatably sleeved on the shaft;
 an acting member rotatably connected to and received within the shaft, the acting member defining a first receiving slot;
 a friction member positioned between the tube and the acting member, the friction member being partially received within the first receiving slot of the acting member and resisting a against the inner surface of the tube; and
 a resilient member received within the shaft and resisting against an inner surface of the shaft and the acting member, thereby creating an elastic force for urging the acting member to tend to rotate relative to the shaft, so that the friction member constantly resists the tube.

18. The hinge assembly of claim 17, wherein the tube is a hollow cylinder; the friction member includes a friction surface, the friction surface of the friction member resists an inner surface of the tube.

19. The hinge assembly of claim 18, wherein the shaft defines one hole for receiving the friction member; the acting member further defines a second receiving slot adjacent to the first receiving slot along a line substantially parallel to the axis of the acting member; the resilient member is partially positioned in the second receiving slot, with one end of the resilient member resisting the inner surface of the shaft, and another end of the resilient member resisting the base wall of the second receiving slot.

20. The hinge assembly of claim 17, wherein the friction member and the acting member are integrally formed.

\* \* \* \* \*